Nov. 10, 1953 D. B. MILLER 2,658,434
GAS LEAKAGE TEST BOX
Filed June 21, 1951 2 Sheets-Sheet 1
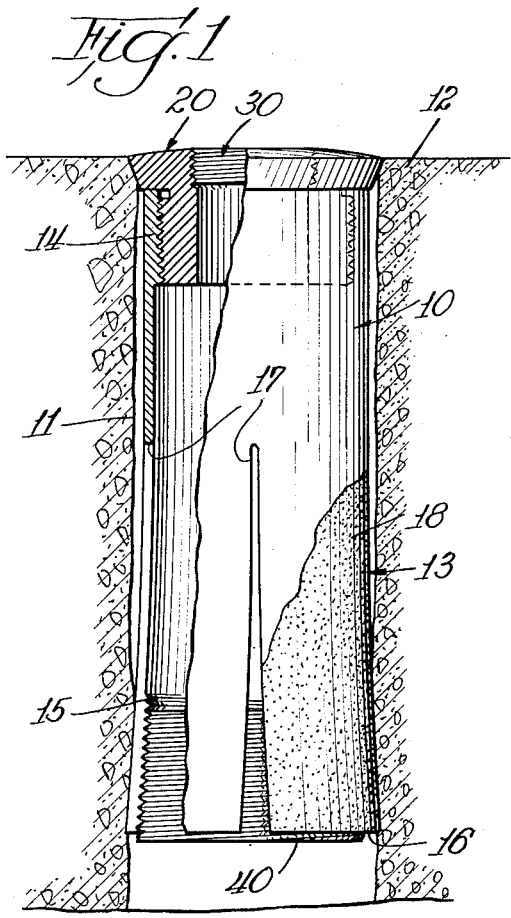
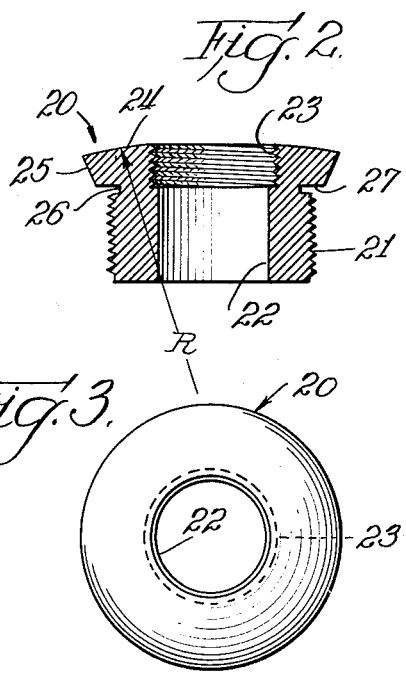
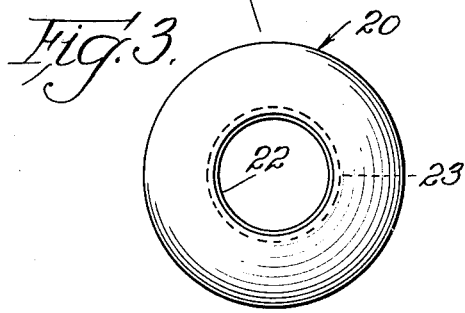
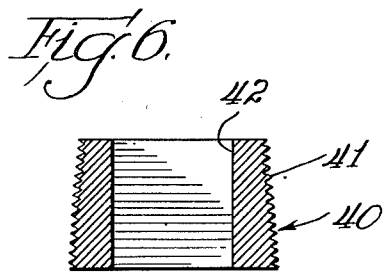
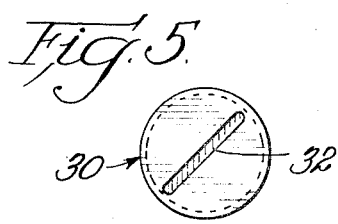
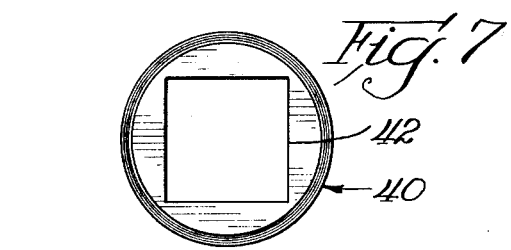
INVENTOR.
Donald B. Miller
BY
Attys.

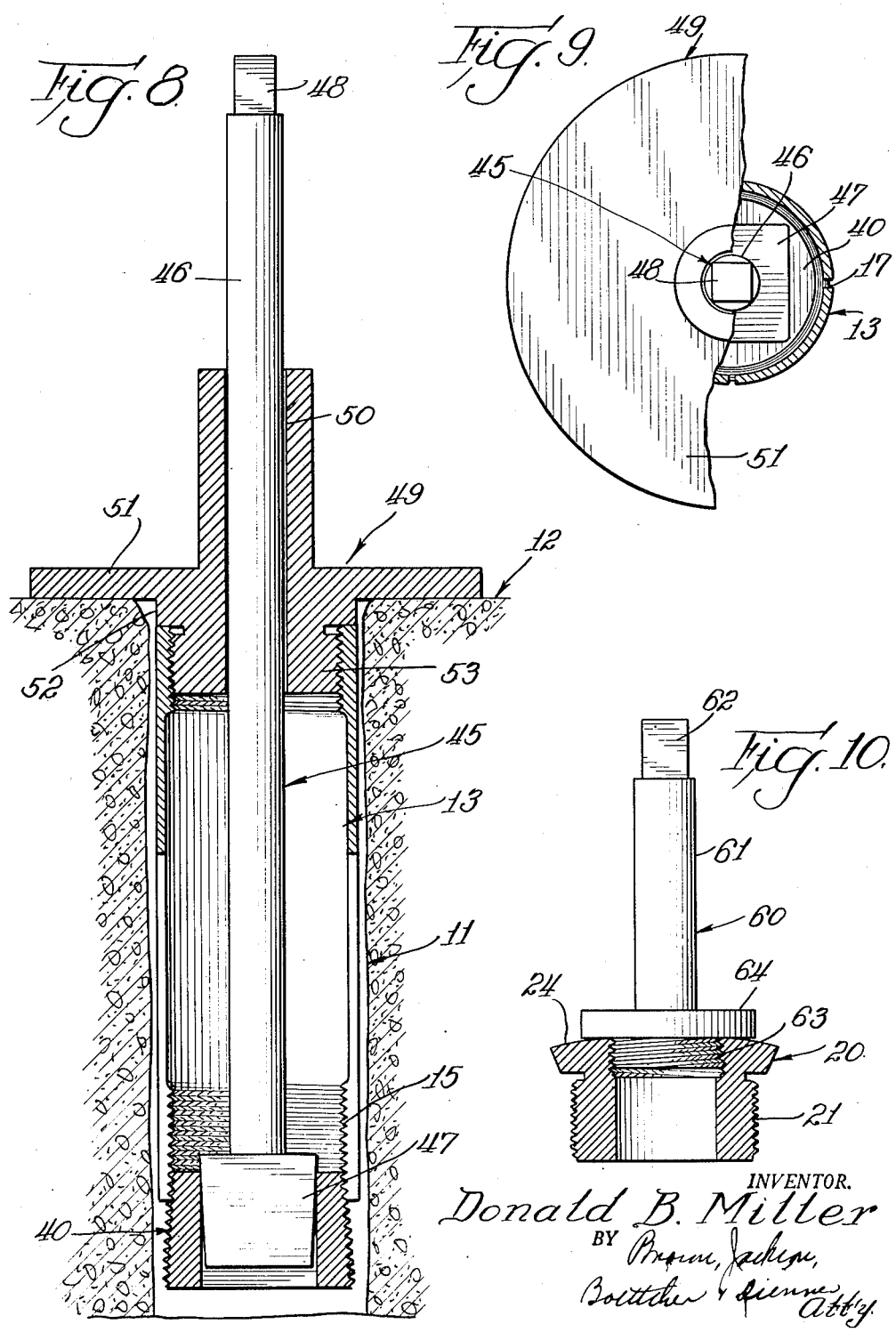

Patented Nov. 10, 1953

2,658,434

UNITED STATES PATENT OFFICE 2,658,434

GAS LEAKAGE TEST BOX

Donald B. Miller, Wheaton, Ill.

Application June 21, 1951, Serial No. 232,797

3 Claims. (Cl. 94—34)

My invention is directed to a new and improved test box construction for assisting gas utility personnel in conducting a leakage survey on gas mains, or the like, positioned underground and beneath a paved surface such as a street, highway or sidewalk.

In metropolitan areas, the location of gas carrying pipe lines or mains is many times beneath a paved roadway or the like. Because of the nature of their product, the gas utility companies are constantly on the lookout for ruptures or breaks in such gas mains which might cause serious leakage problems. In the presently familiar practice, operating personnel are commissioned periodically to conduct leakage surveys of the entire gas main system, a process which is conducted frequently in large municipalities due to the size and extent of the gas main systems.

It will be appreciated that to locate a gas leak in a main which has been buried below a paved street, for instance, it is necessary either to cut through the pavement or to utilize already existing cracks or fissures in that pavement to determine the source of the leak. Both practices are presently followed, but in particular the former. At present a compressed air drill, or the like, is utilized to bore a hole in the pavement in the near vicinity of the gas main to be tested and then a test rod or a probe is thrust through the underlying earth to provide access to the area immediately adjacent and leading to the gas main itself. A gas detector or "Explosimeter" is then utilized in conjunction with the probe to determine the presence of gas. It will be appreciated that in the course of an extensive survey, hundreds of such holes must be made in the paved streets and then filled in, after the tests are completed, to preserve the roadway structure in good repair. The obvious expense, labor and disadvantages of such a practice are apparent.

In order to facilitate the ease of making such a leakage survey, eliminate the necessity of repeatedly drilling new holes in the pavement each time such a survey is conducted, diminish the overall labor costs and generally aid in the preservation of the pavement's condition, I have devised a new and improved leakage test box adapted to be installed permanently in the pavement or roadway for facilitating ready access to the underlying gas mains.

Briefly, my test box comprises a tubular metal member suitably provided with an anti-corrosive exterior coating, or the like, and with expansible anchoring means for rigidly securing the same in the pavement of a street or sidewalk plus additionally having removable access means through its upper end to provide the operating personnel with entry to the gas mains lying therebeneath when conducting a gas test survey by using normal gas leak testing equipment. Further, my test box will be usable again and again for successive leakage surveys and is conveniently removable from the pavement if desired without causing the destruction thereof.

One of the main objects of my invention is to disclose a new and improved permanent test box means for use in paved streets, highways, sidewalks, or the like, to permit ready entry through such pavement.

Another object of my invention is to disclose the structural features of a new and improved permanent test box means having an expansible anchoring means and removable upper test plug associated therewith which adapts such a test box for permanent installation in a paved roadbed, or the like, and provides entry through the pavement for the introduction of gas testing apparatus utilized in conducting a gas leakage survey test.

The above and further objects and desirable features of my invention will be recognized by those familiar with this art from the following detailed description and specification thereof and especially as clarified by the accompanying drawings of its embodied features.

In the drawings:

Figure 1 is a front elevational view, with parts being broken away in cross section, of a gas leakage test box made in accordance with the teachings of my invention and showing the manner in which such is anchored in the pavement;

Figure 2 is a full cross sectioned front elevational view of an access cap adapted to be fitted within the upper end of my test box, as demonstrated in Figure 1 of the drawings;

Figure 3 is a top plan view of the access cap illustrated in Figure 2 of the drawings;

Figure 4 is a front elevational view of a removable test plug adapted to be fitted in the upper end of the access cap illustrated in Figures 2 and 3 of the drawings;

Figure 5 is a top plan view of the test plug illustrated in Figure 4;

Figure 6 is a front elevational view in full cross section of an expansion plug adapted to be inserted in the lower end of my leakage survey box for expanding and anchoring the same as illustrated in Figure 1 of the drawings;

Figure 7 is a top plan view of the expansion plug illustrated in Figure 6;

Figure 8 is a longitudinal cross sectional view, with some parts shown in full elevation, of my test box demonstrating the use of a special installing tool therewith for mounting such in an opening in a paved roadbed or the like;

Figure 9 is a partially broken away top plan view of my test box and installing tool shown in Figure 8; and Figure 10 is a front elevational view, with parts therein shown in cross section, of one type of installing tool utilized for inserting the access cap of Figures 2 and 3 in my test box.

Coming now to the features of my test box 10 as illustrated in its embodied form in Figure 1 of the drawings, it will be recognized that such is to be mounted within a cylindrical vertical opening 11 drilled or otherwise opened in a bed of pavement 12, such as a concrete, brick, macadam or similar paved surface of a roadway or sidewalk. It will be recognized that my test box is composed essentially of four main elements, namely: a cylindrical tubular body member 13, an access cap 20 threadingly mounted at the upper end of the body member 13, a removable test plug 30 threadingly engageable and removably mounted within the upper end of the access cap 20 and a tapered expansion plug 40 threadingly insertable in the lower end of the body member 13.

In detail, the body member 13 comprises substantially a cylindrical tube of cold rolled steel or like material, such as in the embodiment illustrated being approximately five inches in length and one and three-quarter inches in diameter, although these dimensions may be varied as desired to meet the particular operating conditions encountered. The upper end of the body member 13 is provided with a plurality of internal threads, indicated generally at 14, adapted threadingly to receive the access cap 20, as will appear later herein. Threads 14, as in the particular embodiment illustrated, may be formed as U. S. Standard, N. F., 14 threads to the inch, although other threads than this particular type may be used as well. The lower end of the body member 13 is likewise provided with a plurality of internal threads, indicated generally at 15, which in the illustrated embodiment herein likewise are U. S. Standard, N. F., 14 threads to the inch. Placed at convenient intervals along the cylindrical length of the body member 13 and reaching upwardly from the lower edge 16 thereof a distance of approximately six tenths of the body's length are a plurality of slotted apertures 17, herein shown as four in number placed at 90° intervals, providing for the outward radial expansion of the cylindrical segmental portions defined therebetween upon threading reception of the expansion plug 40 within the lower end of body member 13. To prevent undue corrosive effects and deterioration of the body member 13, I conveniently have provided an exterior, non-corrosive coating 18 thereon. Such non-corrosive coating is preferably of a thickness in the neighborhood of .001 inch and may comprise a variety of non-corrosive materials of which a plasticized tape commercially marketed by the Minnesota Mining and Manufacturing Company of St. Paul, Minnesota, under the trade name "Scotch Brand Electrical Tape No. 22" is to be preferred as a convenient coating expedient. Another coating I have found satisfactory for this purpose is marketed commercially by Protective Coatings Inc., of Tampa, Florida, under the trade name of "Cocoon," such comprising a liquid plastic coating material adapted for spray application. Both of these specified materials are corrosion resistant and water-proof and have proved satisfactory in application to prevent undue deterioration of the body portion 13 of my leakage test box, although other non-corrosive additives or coatings are obviously commercially available and probably should prove satisfactory in use.

At the upper end of the body member 13 I have provided a removable access cap member 20, herein illustrated in Figures 1, 2, 3 and 10, as being a substantially cylindrical member provided with a lower external threaded portion 21 adapted to have threaded mating engagement with the internal thread members 14 provided at the upper internal end of the body member 13. A central axial cylindrical opening 22 is provided through the axial length of the cap member 20, such being of a size sufficient for the reception therethrough of a testing probe (not shown) associated with a conventional "Explosimeter" or gas testing apparatus. The upper end of the cylindrical opening 22 is provided with a plurality of internal threads formed as U. S. Standard, N. C., 12 threads to the inch, indicated generally by numeral 23 of Figure 2, and with which the test plug member 30 is engaged, as will appear later herein. In the particular embodiment illustrated herein, the external diameter of threaded portion 21 of the cap 20 is in the nature of 1.619 inches to conform with the diameter of the opening bounded by threads 14 of body member 13, although obviously these dimensions are not critical and may be varied to meet the requirements of size and materials involved. Extending outwardly from the upper end of the cap member 20 is a skirting flange member 24 of a circular plan configuration, as illustrated in Figure 3 of the drawings. It will be recognized from Figure 2 of the drawings in particular, that the lateral skirted surface 25 of the flange member 24 is tapered upwardly to form a truncated conical effect. Further, it will be recognized that the upper surface of the cap member 20, comprising the upper limits of the flange member 24, is provided with a spherical curvilinear configuration of a substantially 6 inch radius R. Preferably the material from which the access cap 20 is manufactured should be a good non-corrosive bronze, brass, nickel, stainless steel, or the like. Immediately beneath flange member 24, a slight cylindrical recess 26 is provided to permit clearance between the lower surface 27 of flange member 24 and the external threads 21 of cap member 20. As herein illustrated, the outside diameter of the flange member 24 is substantially 2 inches and the vertical height thereof is approximately ¼ of an inch, although again these dimensions are not critical and may be varied as desired to meet various operating conditions. In the particular embodiment herein illustrated, the external threaded portion 21 of cap member 20 has a length of approximately ⅝ inch and the threads thereon are U. S. Standard, N. F., 14 threads to the inch, to provide mating engagement with threads 14 of the body member 13.

Fitting into the upper end of cap member 20, and having threading engagement with the internal threads 23 formed centrally of the flange member 24 thereof, I have provided test plug member 30 as illustrated in Figures 1, 4 and 5 of the drawings. It will be recognized from the two figures 4 and 5, that the test plug consists substantially of a foreshortened cylindrical member provided with external threads 31, herein U. S. Standard, N. C., 12 threads to the inch, adapted to engage and threadingly mate with the like internal threads 23 of the cap member 20. As illustrated in Figure 5 of the drawings, I have provided a substantially transversely extending slotted opening 32 on the upper surface of test plug 30, such being a screw driver slot or the like, for purposes of providing a ready means for the insertion and removal of the plug member 30 with the cap member 20. Obviously, other engaging expedients for the removal of cap 30 are available, such as hexagonal or square central openings therein for engagement by a suitable T wrench or the like, although the screw driver slot means illustrated herein is preferred.

In keeping with the general overall dimensions heretofore specified for body member 13 and cap member 20, the external diameter of plug member 30 is one inch, its overall height is substantially ¼ inch, and the slot member 32 formed in the upper surface thereof is approximately ⅛ inch in depth and 11/16 inch long, although again these dimensions may be varied to meet the general dimensions of the survey test box as desired.

At the lower end of body member 13 I have mounted an expansion plug member 40, as illustrated in Figures 1, 6 and 7 of the drawings. It will be recognized from Figure 6, in particular, that expansion plug 40 is substantially conical in elevation, such being tapered upwardly so as to have a widened skirt portion at the lower end thereof. The external surface of plug 40, as illustrated herein, is provided with threads 41 which may be U. S. Standard, N. F., 14 threads to the inch for mating reception in the internal threaded portion 15 of body member 13. As herein illustrated, the overall height of plug 40 is one inch with its upper external diameter being in the nature of 1.625 inches and its lower external diameter being in the nature of 1.680 inches. It will be appreciated again that the dimensions herein specified for this plug are not critical and may be varied in accordance with the overall size and dimensions of my test survey box which may be varied as desired to meet various operational conditions. An internal, axial opening 42 is provided centrally of plug member 40 as illustrated particularly in Figure 7 of the drawings. The side dimensions of opening 42 are approximately 1″ x 1″ to make a square aperture; such being provided for purposes of receiving a similarly sized plug end of a suitable wrench means 45 with which the plug 40 is threadingly inserted and drawn upwardly within the interior of body member 13 in assembling my test box 10 in a bed of pavement, as shown in Figure 8, and as more clearly will be amplified presently. For the expansion plug 40 I prefer to use a material such as cast iron or the like, although other suitable materials having a like non-corrosive character may be utilized with equal facility, as will be appreciated by one cognizant with the art.

*Installation and use*

To facilitate the installation of my leakage test box as I have described heretofore, I have provided the wrench means 45, illustrated in Figures 8 and 9 of the drawings, which comprises an elongated cylindrical metal rod 46 having an enlarged square block 47 formed at its lower end and a plurality of wrench engaging surfaces 48 formed at its upper end. A circular collar member 49 is adapted to be slipped over the upper end of the rod member 46 by virtue of a central axially disposed opening 50 formed therethrough. Intermediate the length of the collar member 49 I have provided a transversely extending circular flange member 51 which is integrally formed with and disposed in overlying relation to a depending cylindrical shoulder portion 52 formed symmetrically about axial opening 50 of the collar member 49. The lower end of the collar member 49, immediately below the shoulder portion 52 thereof, is provided with an externally threaded cylindrical boss portion 53 having an external diameter commensurate with the diameter of threaded portion 14 formed at the upper end of the body member 13; the threads formed on the exterior of boss member 53 being suitable for threading mating engagement with the threaded portion 14 of the body member, as shown in Figure 8.

Further, I have provided a second tool means 60, as illustrated in Figure 10 of the drawings, which may be utilized for threadingly engaging the access cap member 20 with the threaded portion 14 of the body member 13. It will be recognized from Figure 10 of the drawings that the wrench means 60 comprises essentially a cylindrical rod member 61 terminated in an upper square wrench engaging end 62 and having a lower threaded end 63 formed with and immediately below an outwardly extending circular collar portion 64 thereof. The threaded exterior of the lower end 63 of wrench means 60 is provided with suitable threads commensurate with the threaded internal opening 23 of the access cap member 20 whereby the wrench 60 threadingly may be engaged in opening 23 of the cap member 20, as illustrated in Figure 10 of the drawings.

To install a leakage test box as I have described, it is first essential that a vertical cylindrical opening 11 be drilled or otherwise opened in the pavement 12 with a suitable pneumatic drill or other similar means so that opening 11 is formed of a diameter only slightly greater than the external diameter of body member 13 of my test box. After drilling the opening 11, the expansion plug member 40 is threadingly inserted a short distance upwardly into the threaded opening 15 at the lower end of the body member 13 by hand so that it is positioned substantially as illustrated in Figure 8 of the drawings. The wrench means 45 is then axially inserted into the upper end and through the interior of the body member 13 so that the square plug end 47 thereof engages with the squared opening 42 of the expansion plug means 40. The collar member 49 is then slipped over the upper end of rod member 46 and its threaded boss member 53 engaged with the internally disposed threaded portion 14 at the upper end of the body member 13 until the lower face of the overlying and adjacent shoulder portion 52 thereof abuttingly engages the upper end of the body member 13 substantially as illustrated in Figure 8 of the drawings. The body member together with the partially engaged expansion plug and wrench means 45 is then lowered into the opening 11 so that the lower face of the outwardly extending flange member 51 of the wrench's collar member 49 abuttingly engages the upper surface of the pavement 12; this serving to accurately space the upper end of the body member 13 approximately ¼ inch below the upper surface of pavement 12 as determined by the axial length of shoulder portion 52 related to the collar member 49. This having been accomplished, rod member 46 is axially rotated by engaging a wrench or handle means with the upper wrench surfaces 48 thereof so that the tapered expansion plug member 40 will be moved axially upwardly into the lower skirted portion of the body member 13 to expand the segmental portions, intermediate the slotted openings 17 thereof, radially outwardly for engagement with the adjacent side walls of opening 11 (as illustrated in Figure 1 of the drawings). After the tapered plug 40 has been drawn upwardly its full extent within the lower end of body member 13 so that the lower side walls of the body member are firmly engaged with the side walls of opening 11 in the pavement, collar member 49 may be disengaged from the threaded portion 14 of the body member and the entire wrench means 45 withdrawn.

Utilizing the wrench means 60, as illustrated in Figure 10, the access cap member 20 is next threadingly engaged at its upper end with the threaded portion 63 of the wrench 60. The external threaded portion 21 of cap member 20 may then be threadingly engaged and inserted within the upper internally threaded portion 14 of body member 13 by axially rotating the wrench means 60 in an obvious manner. Upon fully engaging the threaded thread members 21 of cap member 20 with the threads 14 of body member 13 so that the lower face 27 of the cap's flange portion 24 abuttingly engages the upper end of body member 13, as shown in Figure 1 of the drawings, it will be appreciated that the conical upwardly flared face 25 of the cap's flange portion 24 will attritionally engage the upper end of the pavement opening 11 with a wedging action. The combined effects of the wedging action provided by the threaded insertion of the cap member 20 at the upper end of the body member and the outward expanding actuation of the lower end of the body 13, as heretofore described, which is brought about by the threaded reception of expansion plug means 40 within the lower end of the body member, cooperate to rigidly tie my test box with opening 11 and prevent its longitudinal axial and rotative movement therein. Having completed the installation of the cap member 20, wrench means 60 may be withdrawn from the threaded opening 23 thereof and the test plug 30 inserted in its stead in an obvious manner by engaging a screw driver blade, or the like, with the slotted aperture 32 formed therein to complete the installation of my test box within the pavement opening 11.

In this latter connection it will be recognized that the removable test plug 30 serves to prevent the flooding of the interior of my test box from rain, condensation or like foreign substances while its removal permits the entry of a test probe and that additionally the upper curvilinear surface of cap 20 formed substantially at a spherical radius provides a simple expedient for protecting the outwardly flared conical face 25 thereof.

In order to conduct a test survey utilizing my test box, it is merely necessary to remove the test plug member 30 from the upper end of the access cap 20 by means of inserting a screw driver blade in the slotted aperture 32 of the plug 30 to threadingly disengage the same from threads 23. Such provides an opening large enough to receive the probe or test bar (not shown) of a conventional gas leak apparatus or "Explosimeter." In the latter connection a leak detector of the type currently marketed by the Mines Safety Appliances Company of Pittsburgh, Pa., under the trade name "Explosimeter" Model 2; the detector marketed by the Davis Emergency Equipment Company Ltd., of Chicago, Illinois, under the trade name "Vapotester"; the detector marketed by the Lor-Ann Instrument Company of New York, N. Y., and Jersey City, N. J. and designated "Lor-Ann EP 200," or that sold by The Heiland Research Corporation of Denver, Colorado, as their "Heiland G–2" gas leak detector will be satisfactory for use with my test box, as herein set forth.

While I have herein shown and described one form in which the features of my invention may appear, it will be appreciated that numerous changes, modifications, and substitutions of equivalents may be made therein without departing from the spirit and scope of my invention. Therefore, I do not wish to be limited to the specific embodiment and classifications of materials herein set forth except as may appear in the following appended claims.

I claim:

1. In a gas leak test box of the class described, a cylindrical tubular body member, an anti-corrosive coating covering the exterior of said body member, expansible plug means insertable within the lower interior of said body for expanding the lower sidewalls thereof radially outward, a plurality of longitudinal slotted openings in the lower side walls of said body member to accommodate said expansible actuation of said plug, a cap member threadingly connected to the upper end of said body member, an outwardly flared conical flange element, associated with said cap member, extending radially outward of the sidewalls of said body, said flange cooperating with said expansible plug to create a wedging holding action for purposes of maintaining said body fixed within a cylindrical opening, and a removable test plug means within said cap providing entry to the interior of said body member.

2. A gas leakage test box of the class described, adapted to permit accessible entry through the paved surface of a highway or the like, comprising, a cylindrical tubular metal body member insertable within a cylindrical vertical opening extending through said pavement, a plurality of longitudinal slotted openings formed in said body member, reaching from the lower end thereof partially along its longitudinal length, a truncated conical expansion plug, having a central axial aperture therethrough, threadingly engageable with the lower interior of said body member, a cap member threadingly insertable within the upper interior of said body member and having a central axial aperture therethrough, an outwardly flared flange at the upper end of said cap extending exteriorly and radially outward of said body member and having a truncated conical, upwardly flared peripheral surface thereon, said cap and plug being threadingly and co-axially movable in and out of said body member with threaded movement of said plug into said body serving to flare the lower portion of the latter outwardly for engagement with the lower sidewalls of said opening in said pavement and threaded movement of said cap into said body serving to wedge said conical surface associated therewith against the upper sidewalls of said opening whereby said plug and cap cooperate to lock said body in said opening against rotative and longitudinal axial movement; and a removable test plug threadingly insertable within said cap's central axial aperture, the removal of said test plug permitting the thrusting of a gas test probe through said pavement, via said body's interior and the apertures in said cap and expansion plug.

3. In a gas leak test box of the class described, a tubular body member adapted for insertion in a pavement opening, flange means at the upper end of said body member extending radially outward of the cylindrical sidewalls thereof, open-centered expansion plug means insertable within the lower interior of said body member for expanding the lower sidewall portion thereof radially outward, said body member having a plurality of elongated slotted openings extending from its lower end partially along its length to accommodate the expansible action of said plug means, said plug means cooperating with said flange means to lock said body member tightly in the pavement opening, and a test plug means removably mounted in the upper end of said body member for accommodating the passage of a test probe through the interior of said body member and the open center of said expansion plug means.

DONALD B. MILLER.

References Cited in the file of this patent

UNITED STATES PATENTS

| Number | Name | Date |
|---|---|---|
| 343,933 | Walker | June 15, 1886 |
| 478,424 | Gueguen | July 5, 1892 |
| 492,227 | O'Neil | Feb. 21, 1893 |
| 546,258 | Suverkrop | Sept. 10, 1895 |
| 1,809,613 | Walker | June 9, 1931 |
| 2,512,169 | Nachtigal | June 20, 1950 |